United States Patent
Nohara et al.

(10) Patent No.: US 6,731,675 B2
(45) Date of Patent: May 4, 2004

(54) RECEIVING DEVICE FOR SPREAD SPECTRUM COMMUNICATION SYSTEM

(75) Inventors: Manabu Nohara, Tsurugashima (JP); Osamu Yamazaki, Tsurugashima (JP); Yasuteru Kodama, Tsurugashima (JP); Masami Suzuki, Tsurugashima (JP); Katsunori Arakawa, Tsurugashima (JP); Hiroto Inoue, Tsurugashima (JP); Satoshi Odagawa, Tsurugashima (JP); Takehiko Shioda, Tsurugashima (JP); Masahiro Okamura, Tsurugashima (JP); Takayuki Akimoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 547 days.

(21) Appl. No.: 09/812,955

(22) Filed: Mar. 27, 2001

(65) Prior Publication Data

US 2001/0036220 A1 Nov. 1, 2001

(30) Foreign Application Priority Data

Mar. 28, 2000 (JP) .................................... 2000-088798

(51) Int. Cl.[7] .............................................. H04B 1/707
(52) U.S. Cl. ...................................... 375/147; 375/150
(58) Field of Search ................................ 375/130, 147, 375/150, 142; 370/342

(56) References Cited

U.S. PATENT DOCUMENTS

| 4,567,588 | A | * | 1/1986 | Jerrim ........................ 370/479 |
| 5,940,433 | A | * | 8/1999 | Sawahashi et al. ......... 375/149 |
| 6,301,294 | B1 | * | 10/2001 | Hara et al. .................. 375/152 |

* cited by examiner

*Primary Examiner*—Temesghen Ghebretinsae
(74) *Attorney, Agent, or Firm*—McGinn & Gibb, PLLC

(57) ABSTRACT

A receiving device is provided with a DLL circuit of a reduced scale. An inverse spreading processing to ensure the synchronism with a received signal and a processing to inversely spread original data in the received signal are performed by a time-sharing operation using one inverse spreading circuit and one integrator. During a period in which synchronous data for detecting a slot duration included in the received signal is received, the synchronous data is alternately inversely spread by an early code and a late code and sample-hold circuits alternately sample and hold the integrated output. Further, based on the difference (error signal) between sample-hold signals, the early code, the late code and a reference code outputted from a code sequence generator are synchronized with the received signal. Then, the inverse spreading circuit and an integrator inversely spread the original data in the received signal based on the synchronized reference code and a detection output is generated by integrating the inverse spreading output.

8 Claims, 13 Drawing Sheets

RECEIVING DEVICE FOR SPREAD SPECTRUM COMMUNICATION SYSTEM

BACKGROUND OF THE INVENTION

1. Field of the Invention

The present invention relates to a receiving device for a spread spectrum communication system.

2. Description of Related Art

Recently, a system which adopts wireless communication such as a cordless telephone, a portable telephone or a mobile communication has been rapidly spreading and much attention has been focused on a spread spectrum communication system. Further, a CDMA (Code Division Multiple Access) which is a multiple access (Multiple Access) method using the spread spectrum communication system has gained attention as a fundamental technique of a portable telephone system for the next generations.

In the CDMA system, transmission signals are subjected to a narrow-band modulation and the modulated waves by this narrow-band modulation are converted into transmission signals of broad band by performing the spectrum spreading with the spread code sequence and the transmission signal in the broad band are transmitted to the receptions side. In the reception side, the received signals are inversely spread with the spread code sequence so as to generate the inverse spreading output. By detecting and demodulating this inverse spreading output, the signals transmitted from the transmission side can be reproduced.

The transmission and the reception are performed in the transmission side and the reception side by spread processings which are inverted from each other as described above. In the receiving device provided in the conventional portable telephone, a DLL (Delayed Locked Loop) circuit having the structure shown in FIG. 1 is used in order to ensure the synchronism with the received signals.

The conventional DLL circuit shown in FIG. 1 is provided with a spread code sequence generator 1, inversion spread circuits 2, 3, 4, integrators 5, 6, 7 and an adder-subtractor 8.

Here, the spread code sequence generator 1 generates spread code sequence DPC, DEC and DLC of PN series (Pseudorandom Noise) which are subjected to the phase control in response to error signals Epe outputted from the adder-subtractor 8. That is, the spread code sequence generator 1 outputs the spread code sequence DPC which is used to actually perform the inverse spreading of the received signals Din, the spread code sequence (called "Early Code") DEC whose phase is advanced or lead by a half chip from the spread code sequence DPC and the spread code sequence (called "Late Code") DLC whose phase is delayed by a half chip from the spread code sequence DPC.

The inversion spread circuit 4 obtains the cross correlation P between the received signals Din and the inverse spread code sequence DPC and the integrator 7 generates a detection output Dout by integrating the correlation output P.

The inverse spreading circuits 2, 3 obtain respective cross correlations E, L between the received signals Din and the spread code sequence DLC, DEC and the integrators 5, 6 integrate respective correlation outputs E, L and supply them to the adder-subtractor 8.

Accordingly, error signals Epe indicative of the difference of respective integrated values of the correlation outputs E, L are outputted from the adder-subtractor 8. Then, the phase control of the spread code sequence generator 1 is fedback by this error signals Epe so that the spread code sequence DPC, DEC, DLC which ensure the synchronism with the received signals Din can be generated. At the same time, the correlation output (inverse spreading output) P and the detection output Dout which are synchronous with the received signals Din can be also obtained.

However, the above-mentioned DLL circuit further requires two inverse spreading circuits 2, 3 and two integrators 5, 6 respectively to ensure the synchronism with the received signals Din in addition to the inverse spreading circuit 4 and the integration circuit 7 for performing the inverse spreading and the detection of the received signals Din and hence, there has been a problem that the scale of the circuit has become large-sized.

Particularly, in the receiving device of RAKE system which positively utilizes multiple paths, for example, in the receiving device having N pieces of multiple paths, it becomes necessary to ensure 3 N pieces of the inverse spreading circuits and the integration circuits and hence, there has been a problem that the circuit scale becomes large-sized.

OBJECT AND SUMMARY OF THE INVENTION

The present invention has been made to overcome the above-mentioned problems and it is an object of the present invention to provide a receiving device which is capable of miniaturizing the scale of the circuit.

To achieve the above-mentioned objects of the present invention, a receiving device for a spread spectrum communication system according to a first aspect of the present invention includes a correlation arithmetic part which performs a cross correlation arithmetic between a code sequence and a received signal, an integrator which integrates a correlation output generated by the above-mentioned correlation arithmetic part, a holding part which holds an integrated output generated by the integrator, an error detector for generating an error signal indicative of a phase difference between the code sequence and the received signal based on a holding signal held by the holding part, code sequence generator which performs a phase control opertion in such a way that the code sequence is made to match in phase with the received signal based on the error signal generated by the error detector and supplies a phase-controlled code sequence to the correlation arithmetic part, wherein the correlation arithmetic part performs a cross correlation arithmetic between data other than original data which is included in the received signal and the code sequence and a cross correlation arithmetic of the original data included in the received signal and the code sequence in a time-sharing fashion, and the holding part holds an integrated output outputted from the integrator when the correlation arithmetic part performs the cross correlation arithmetic between the data other than the original data which is included in the received signal and the code sequence.

With such a structure, an inverse spreading processing and a detection processing of the original data included in the received signals, and an inverse spreading processing and a detection processing of data other than the original data included in the received signal are performed in a time-sharing fashion using one correlation arithmetic part and one integrator. That is, the holding parts holds the integrated outputs obtained by performing the inverse spreading and the integration processing of the data other than the original data included in the received signal, and further, the error detector detects the actual phase difference between the received signal and the code sequence based on the holding signal and outputs the error signal. Based on this error signal, the code sequence generator adjusts the phase of the code sequence so as to ensure the synchronization with the received signal, and further, the above-mentioned correlation arithmetic part and the integrator perform the inverse spreading and the integration processing of the original data included in the received signal based on the adjusted code sequence.

Since the processing to ensure the synchronization with the received signal and the processing to perform the inverse spreading and the detection of the original data in the received signal based on the synchronization-ensured code sequence can be performed by one correlation arithmetic part and one integrator, a receiving device having fewer parts and a circuit of a reduced scale can be realized.

A receiving device in a spread spectrum communication system according to a second aspect of the present invention includes a correlation arithmetic part which performs a cross correlation arithmetic between a code sequence and a received signal, an integrator which integrates correlation outputs generated by the above-mentioned correlation arithmetic part, a holding part which holds an integrated output generated by the integrator, a code sequence generator which outputs the code sequence by performing a phase control operation based on a holding signal held by the holding part such that the code sequence is made to match in phase with the received signal and also outputs a delay code sequence which is delayed from the code sequence by a given phase and a leading code sequence which leads the code sequence by the given phase, and an adder-subtractor which generates a dofferetial code sequence of difference between the delay code sequence and the leading code sequence which are outputted from the code sequence generator, wherein the correlation arithmetic part performs a cross correlation arithmetic between data other than an original data which is included in the received signal and the code sequence of difference and a cross correlation arithmetic of the original data included in the received data and the code sequence in a time-sharing fashion, and the holding parts holds an integrated output outputted from the integrator when the correlation arithmetic part performs the cross correlation arithmetic between the data other than the original data which is included in the received signal and the differential code sequence.

With such a structure, an inverse spreading processing and a detection processing of the original data included in the received signal and an inverse spreading processing and a detection processing of data other than the original data included in the received signal are performed in a time-sharing fashion using one correlation arithmetic part and one integrator, and the holding part holds the integrated output which is generated by the inverse spreading processing and the detection processing of the data other than the original data contained in the received signal. Based on the holding signal which is held by this holding part, the code sequence generator outputs the code sequence by performing the phase control in such a way that the code sequence is made to match in phase with the received signal and outputs the delay code sequence which is delayed from the code sequence by a given phase and the leading code sequence which leads the code sequence by the given phase. Then, the adder-subtractor generates the differential code sequence of the difference between the delay code sequence and the leading code sequence.

With such a structure, the correlation arithmetic part and the integrator perform the inverse spreading processing and the detection processing of the differential code sequence and the data other than the original data included in the received signal, and the code sequence generator performs the tracking of the synchronization to the received signal based on the holding signal generated by such processing. Further, the correlation arithmetic part and the integrator repeat the processing consisting of inverse spreading processing and the detection processing of the code sequence which is synchronously tracked and the original data which is contained in the received signal.

In this manner, since the processing to ensure the synchronism with the received signals and the processing to inversely spread and detect the original data in the received signal with the synchronism-ensured code sequence can be performed by one correlation arithmetic part and one integrator, the receiving device having a small number of parts and a circuit of a reduced scale can be realized.

A receiving device in a spread spectrum communication system according to a third aspect of the present invention includes code sequence generator which generates a code sequence, a phase-delay code sequence which is delayed from the code sequence by a given phase and a phase-leading code sequence which leads the code sequence by the given phase, and outputs the code sequences, adder-subtractor which generates a differential code sequence of the difference between the phase-delay code sequence and the phase-leading code sequence outputted from the code sequence generator, first correlation arithmetic part which performs the cross correlation arithmetic between the differential code sequence and the received signal, an integrator which integrates a correlation output generated by the first correlation arithmetic part, and second correlation arithmetic part which performs cross correlation arithmetic between the code sequence and the received signal, wherein the code sequence generator performs a phase control based on integrated outputs outputted from the integratior such that the code sequence, the phase-delay code sequence and the phase-leading code sequence are made to match in phase with the received signal and outputs the the phase controlled code sequences.

With such a structure, the first correlation arithmetic part, the integrator, the code sequence generator and the adder-subtractor perform the processing for ensuring the synchronization with the received signal, and second correlation arithmetic part performs the correlation arithmetic between the synchronization-ensured code sequence which is outputted from the code sequence generator and the received signals so that the received signal can be inversely spread accurately.

In this manner, with the provision of merely two pieces of correlation arithmetic parts, the processing to ensure the synchronism with the received signal and the processing to perform the inverse spreading of the received signal using the synchronization-ensured code sequence can be performed and hence, a receiving device having a small number of parts and a circuit of a reduced scale can be realized.

DESCRIPTION OF THE PREFERRED EMBODIMENTS

Figure 5:
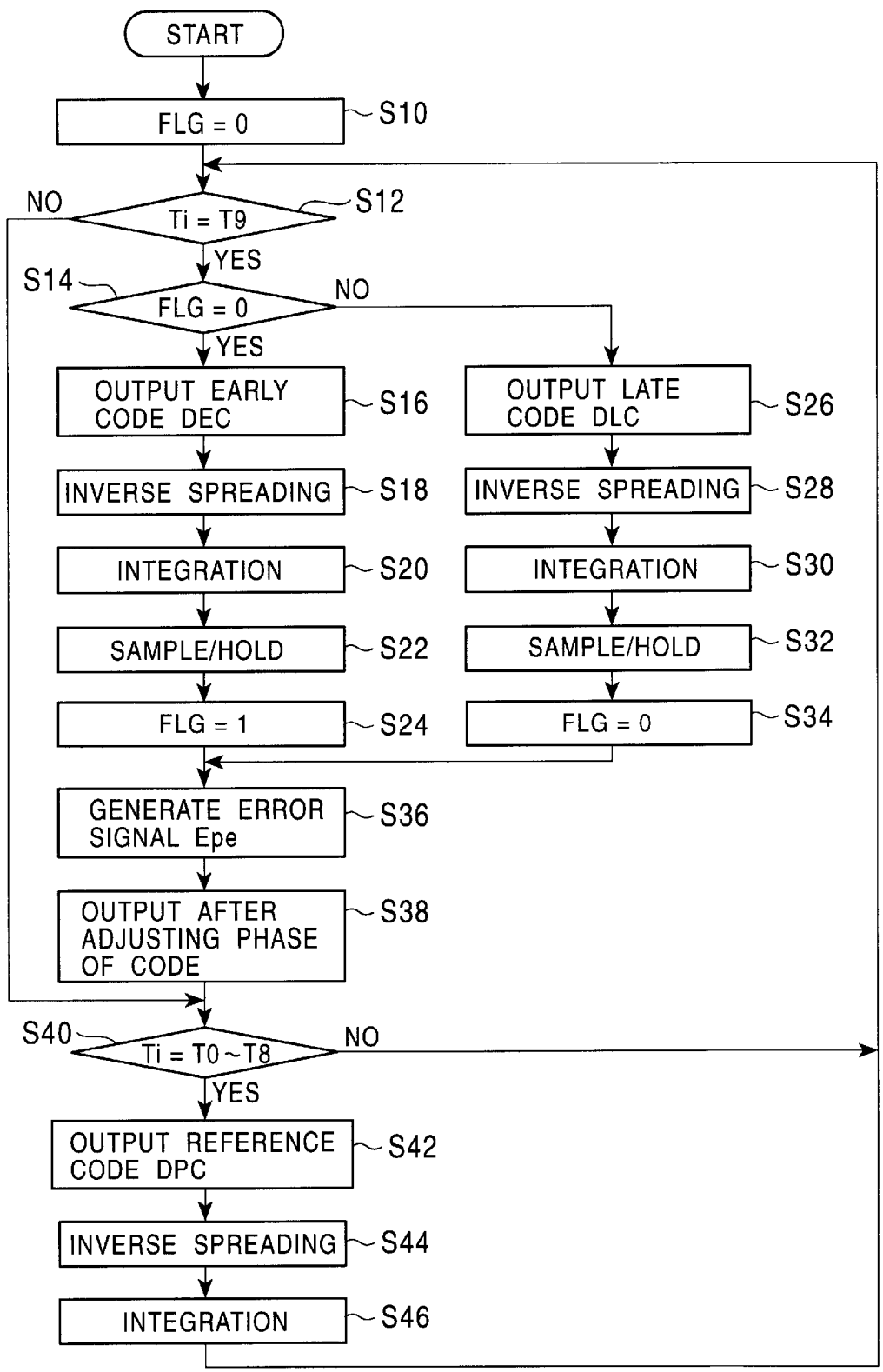
FIG. 5 is a flow chart showing the manner of operation of the DLL circuit provided to the receiving device of the first embodiment.
Figure 6:
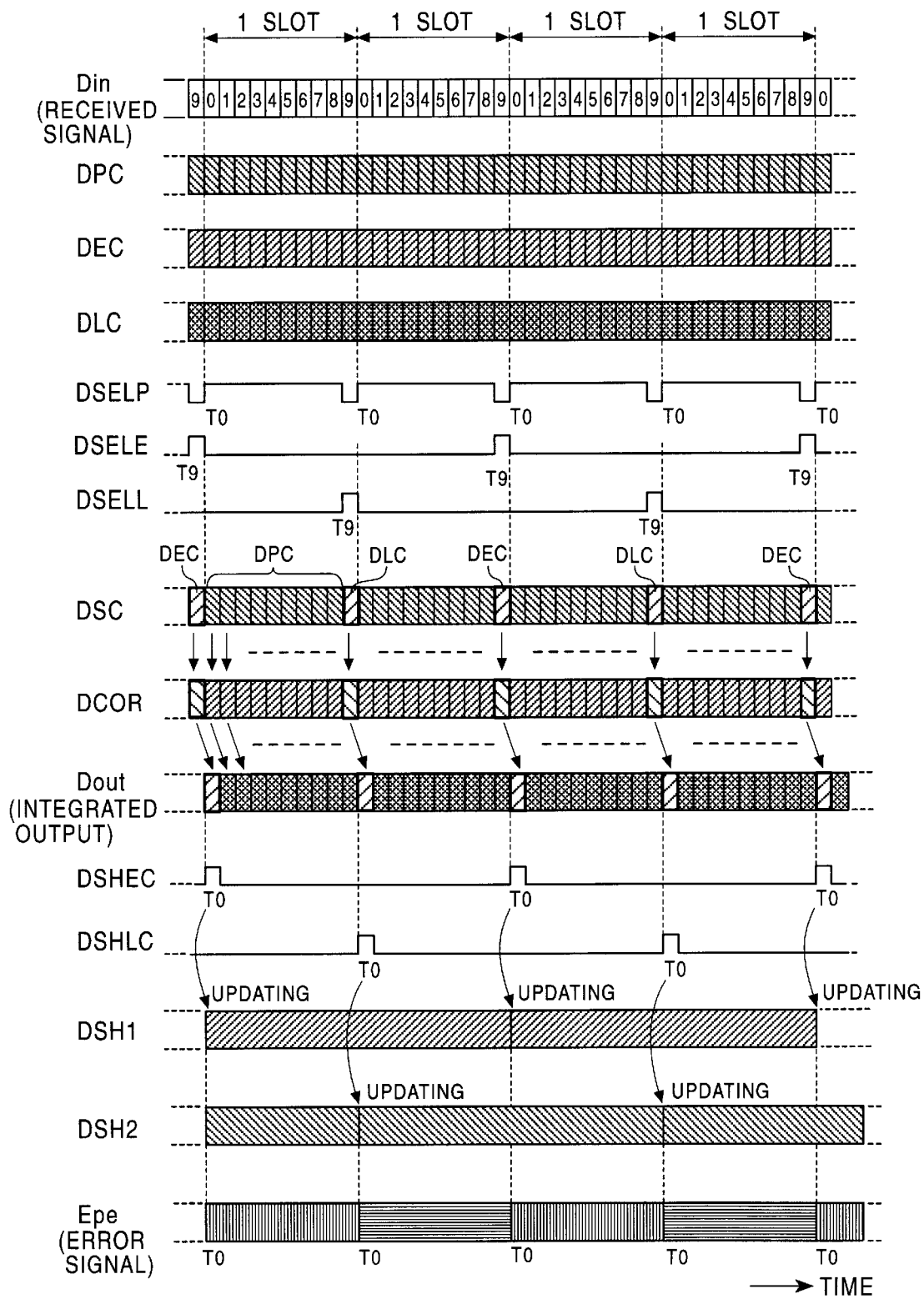
FIG. 6 is a timing chart showing a timing of signals generated by the DLL circuit provided to the receiving device of the first embodiment.
Figure 7:
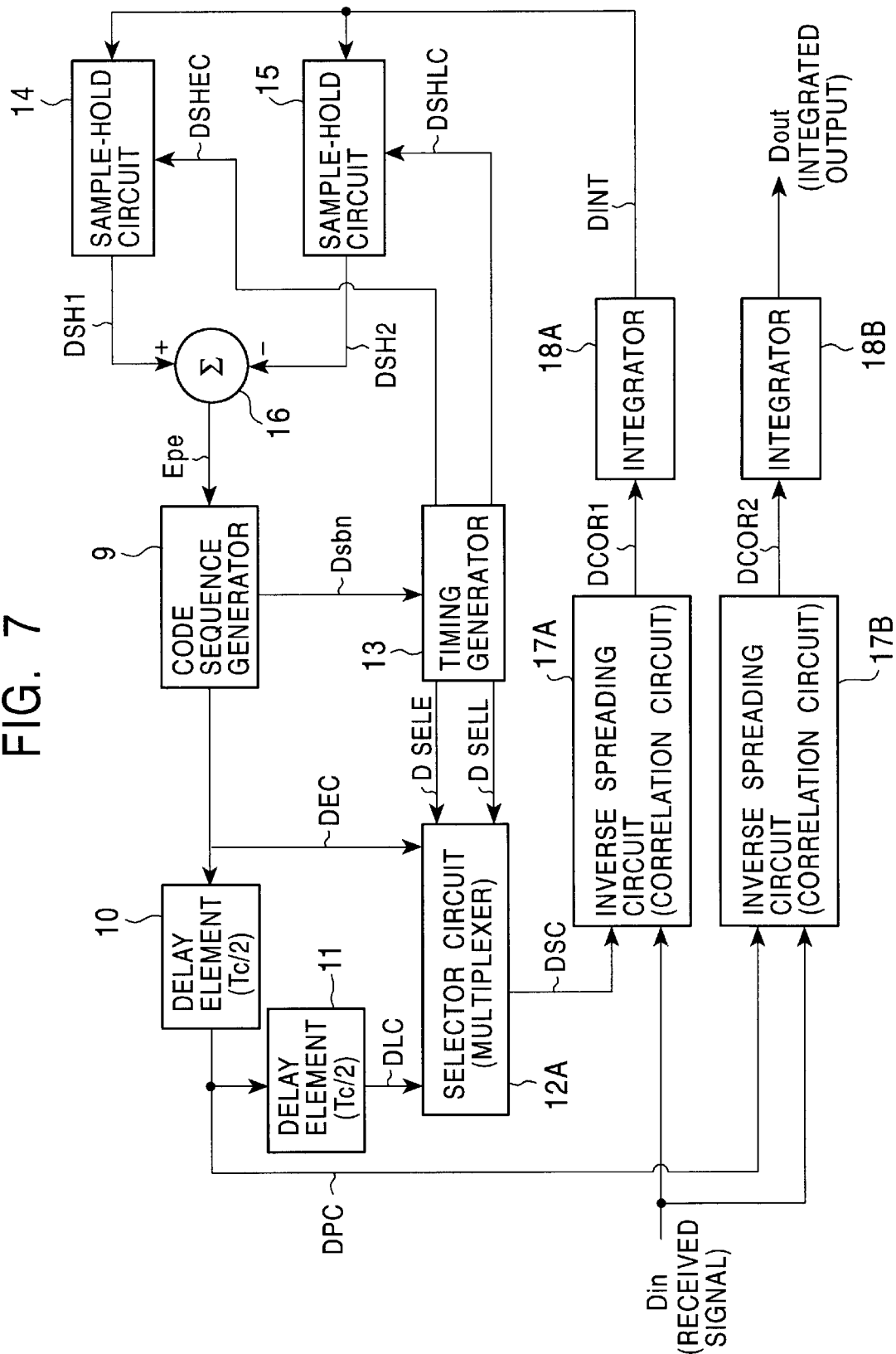
FIG. 7 is a block diagram showing a constitution of a DLL circuit provided to a receiving device of a second embodiment of the present invention.
Figure 8:
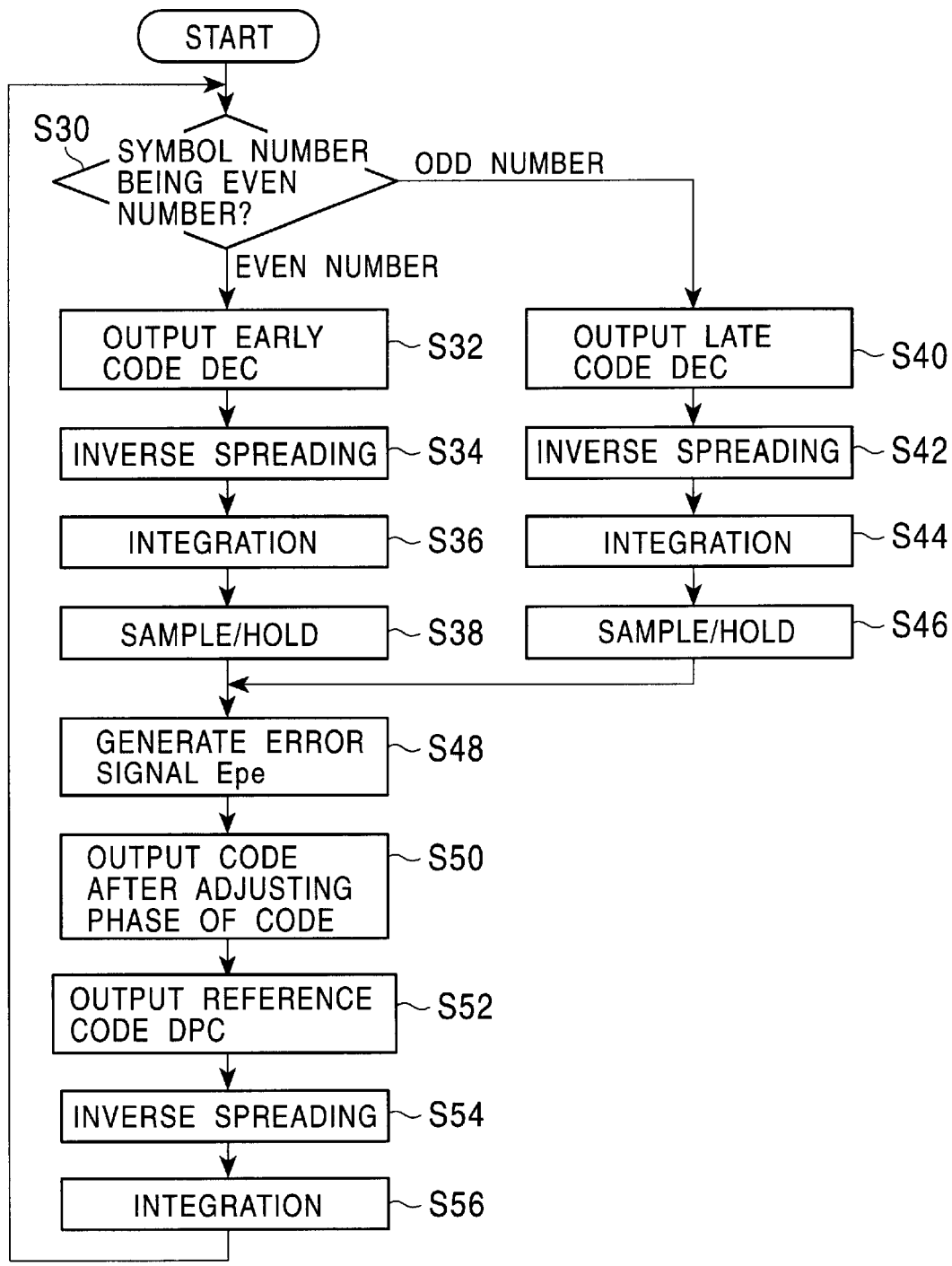
FIG. 8 is a flow chart showing the manner of operation of the DLL circuit provided to the receiving device of the second embodiment.
Figure 9:
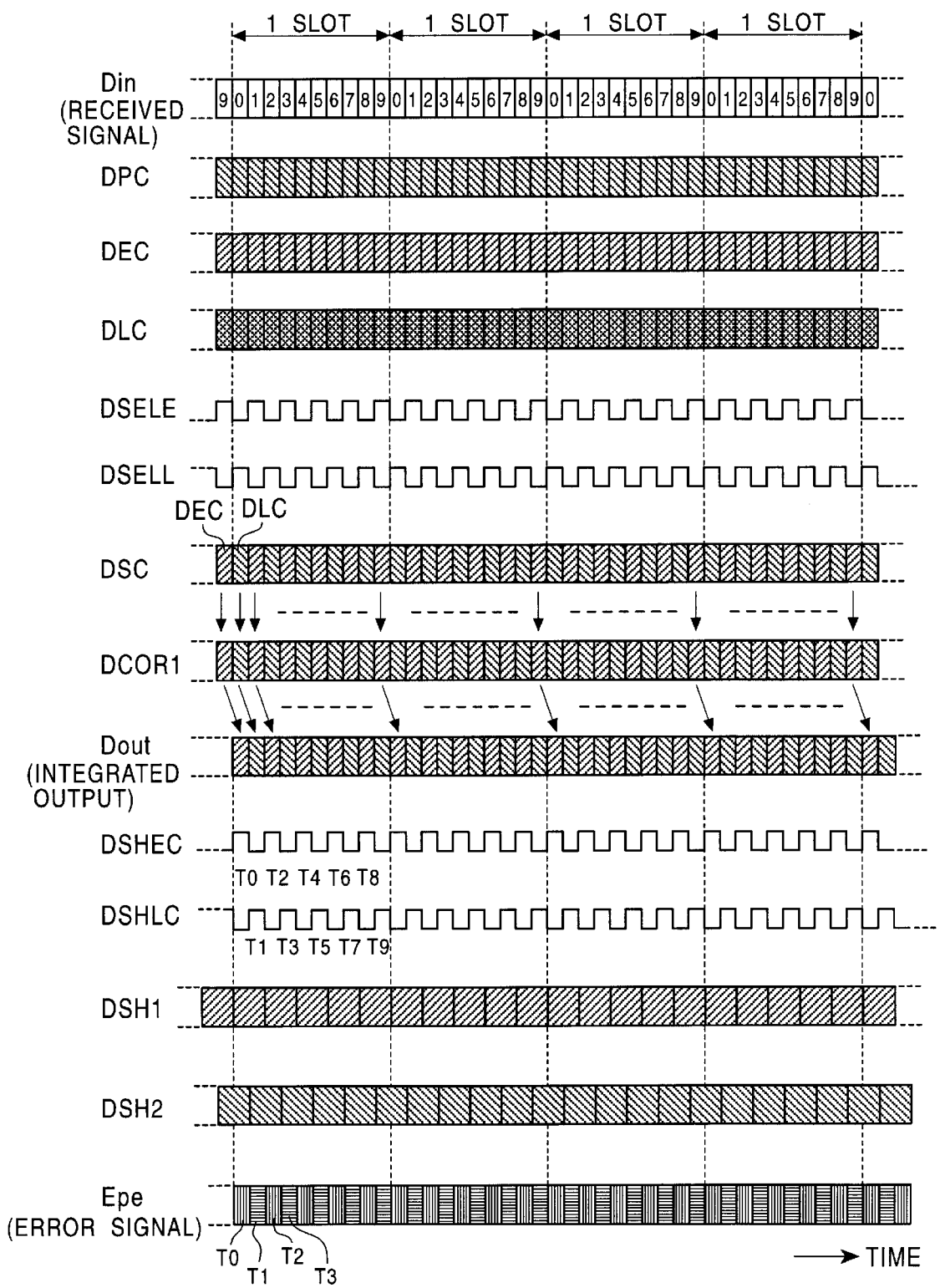
FIG. 9 is a timing chart showing a timing of signals generated by the DLL circuit provided to the receiving device of the second embodiment.
Figure 10:
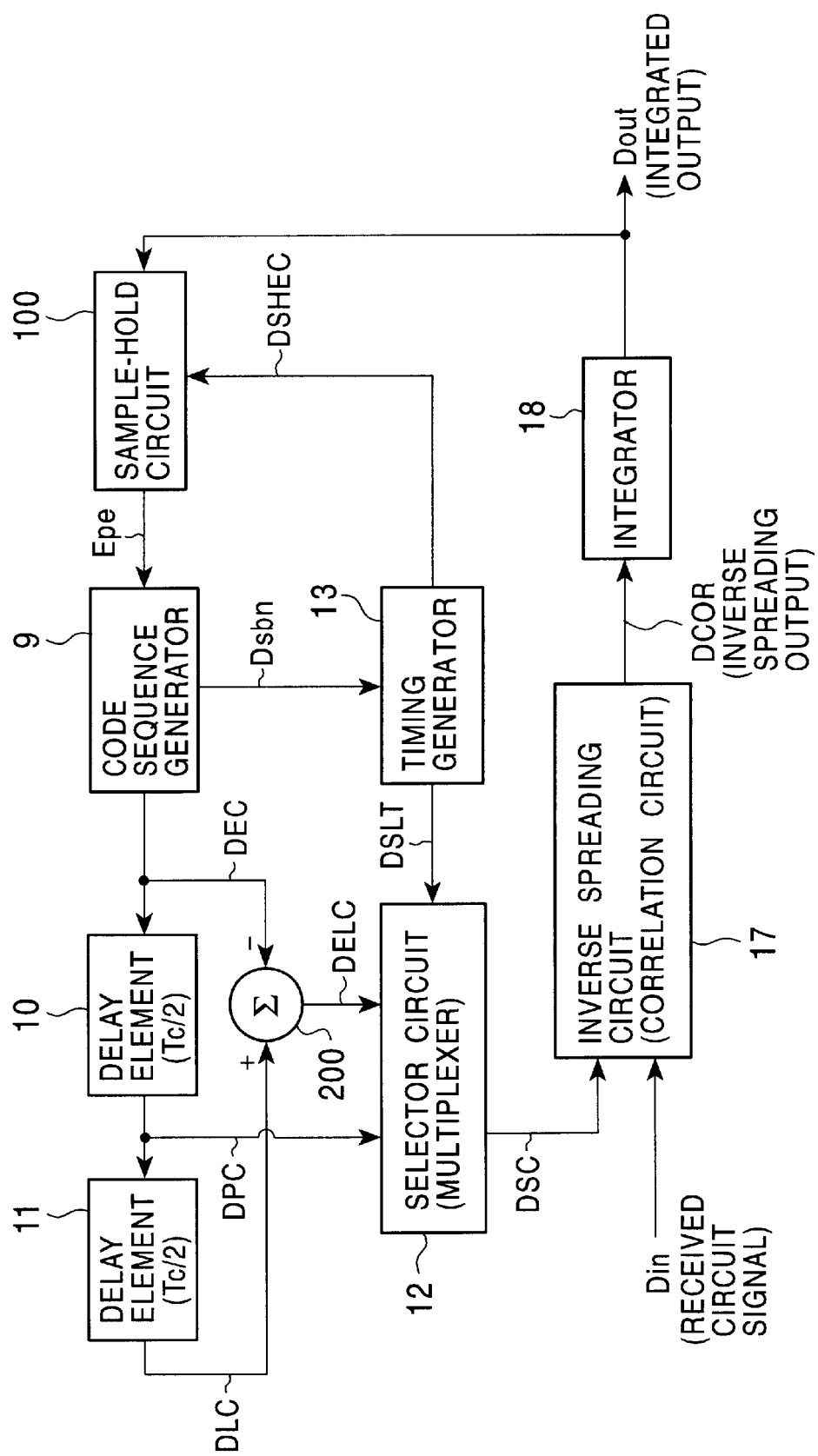
FIG. 10 is a block diagram showing a constitution of a DLL circuit provided to a receiving device of a third embodiment of the present invention.
Figure 11:
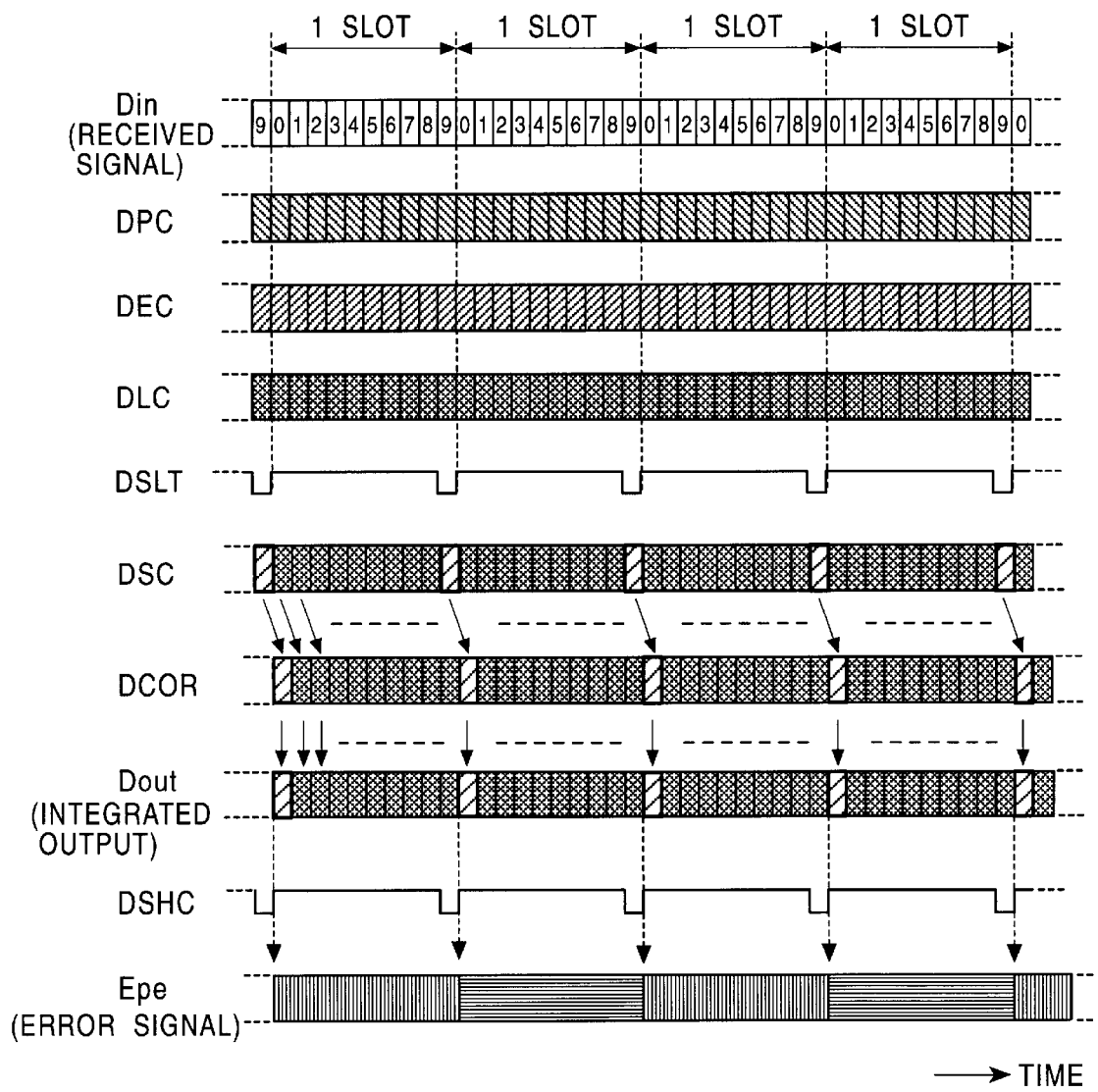
FIG. 11 is a timing chart showing a manner of operation of the DLL circuit provided to the receiving device of the third embodiment.
Figure 12:
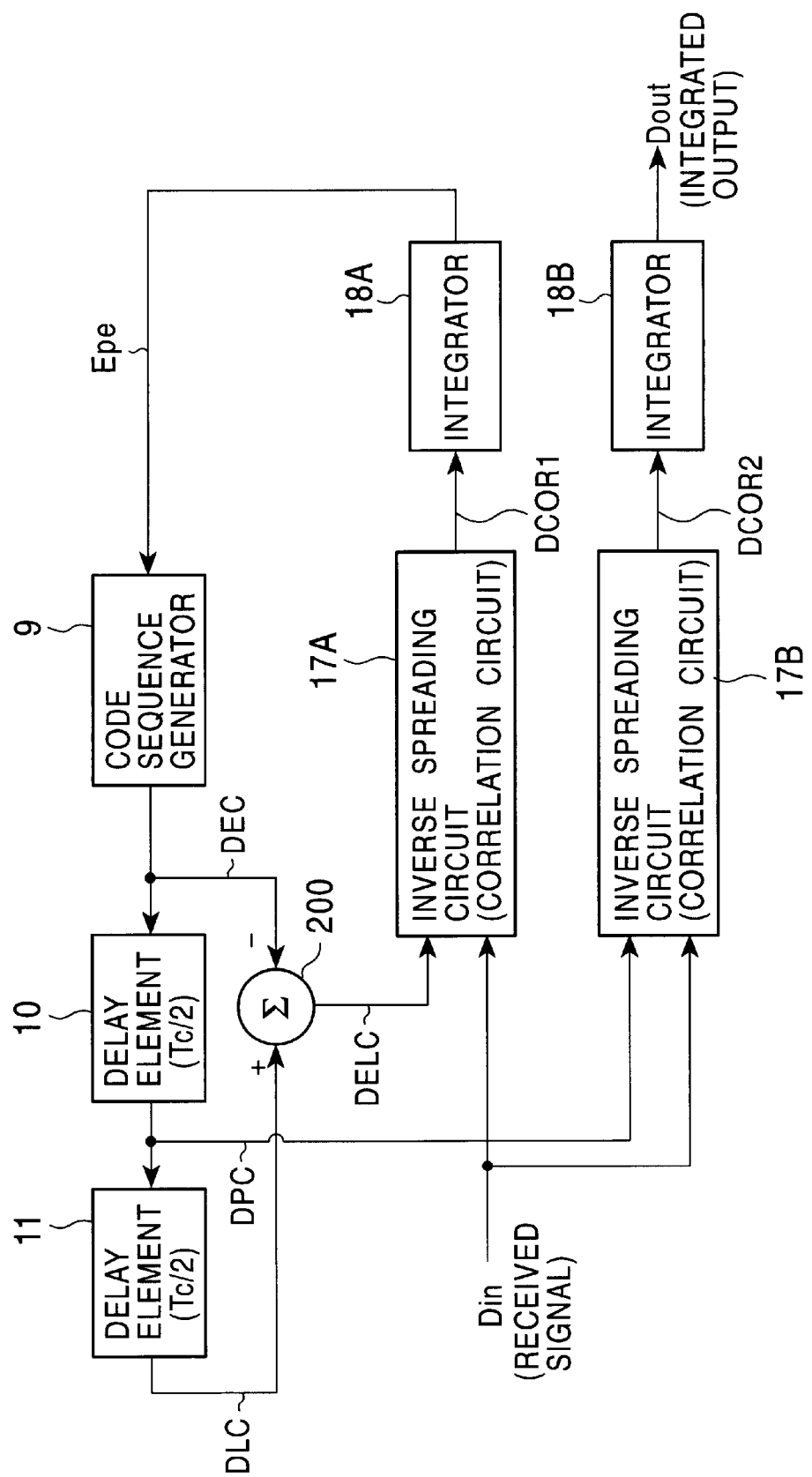
FIG. 12 is a block diagram showing a constitution of a DLL circuit provided to a receiving device of a fourth embodiment of the present invention.
Figure 13:
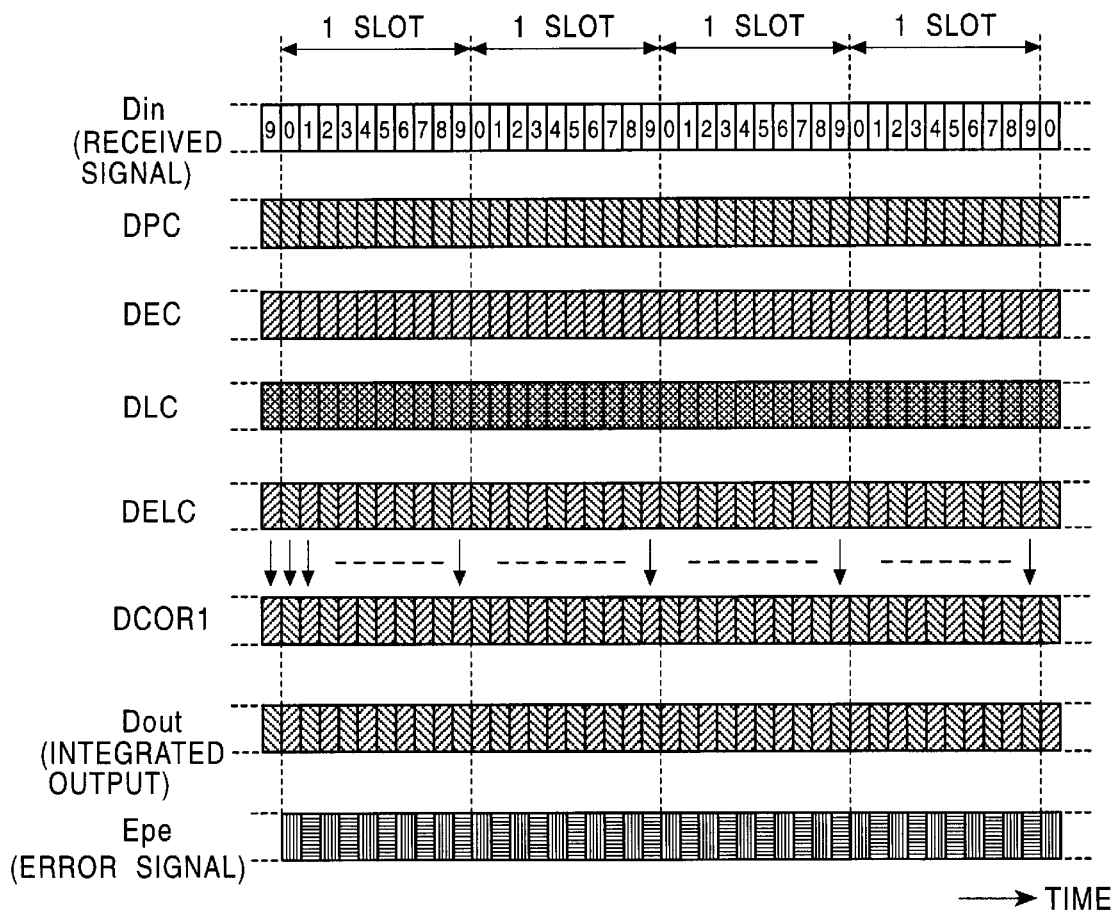
FIG. 13 is a timing chart showing a manner of operation of the DLL circuit provided to the receiving device of the fourth embodiment.

Receiving devices of several embodiments of the present invention are explained in conjunction with FIG. 2 to FIG. 13. In these drawings, FIG. 2 to FIG. 6 show the receiving device of the first embodiment, FIG. 7 to FIG. 9 show the receiving device of the second embodiment, FIG. 10 and FIG. 11 show the receiving device of the third embodiment, and FIG. 12 and FIG. 13 show the receiving device of the fourth embodiment.

Figure 2:
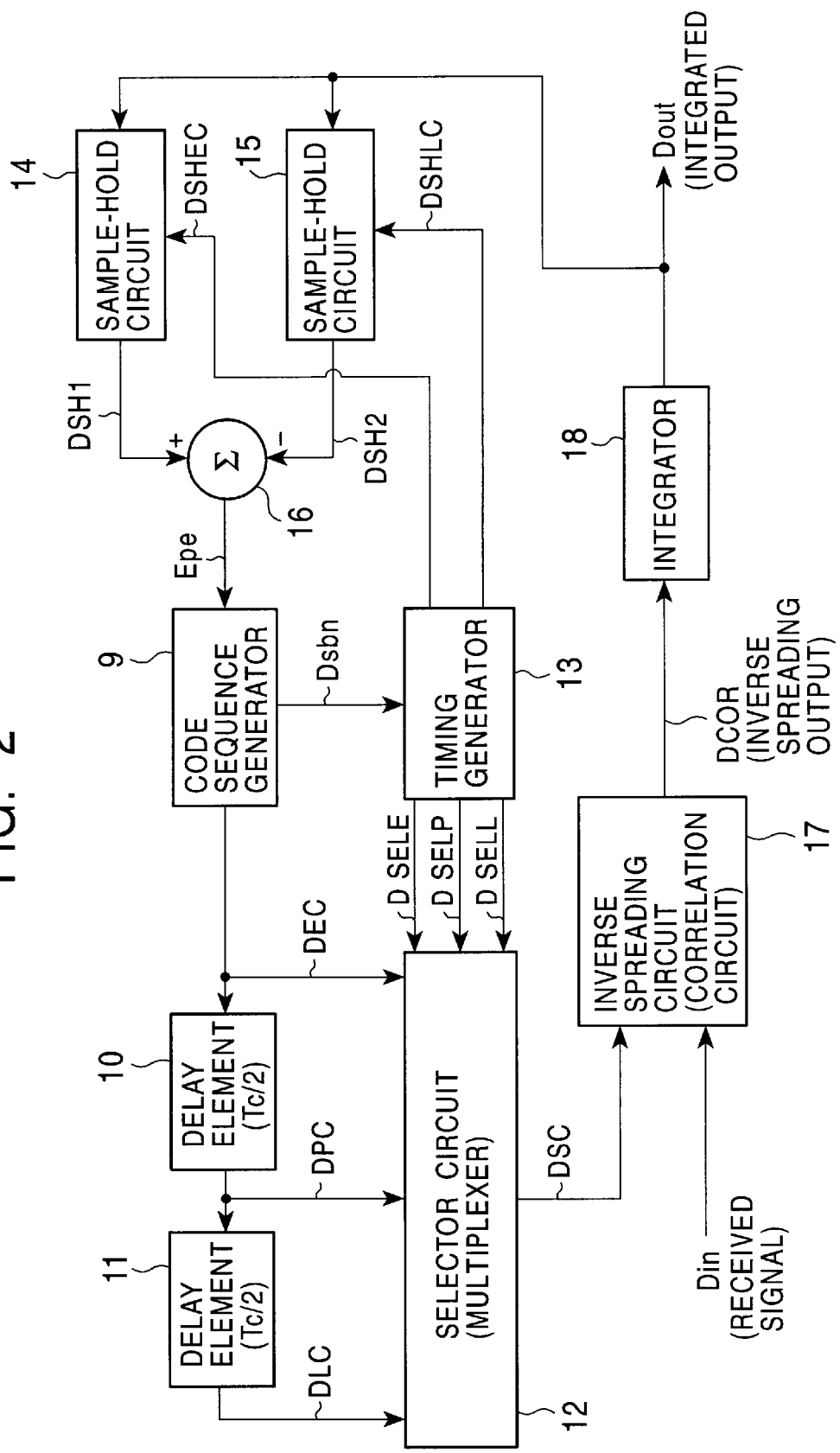
FIG. 2 is a block diagram showing a constitution of a DLL circuit provided to a receiving device of a first embodiment of the present invention.

The receiving device of the first embodiment includes a DLL (Delay Locked Loop) circuit shown in a block diagram of FIG. 2.

This DLL circuit is constituted by a code sequence generator 9, delay elements 10, 11, a selector circuit 12, a timing generator 13, sample-hold circuits 14, 15, an adder-substractor 16, an inverse spreading circuit 17 and an integrator 18.

Figure 3:
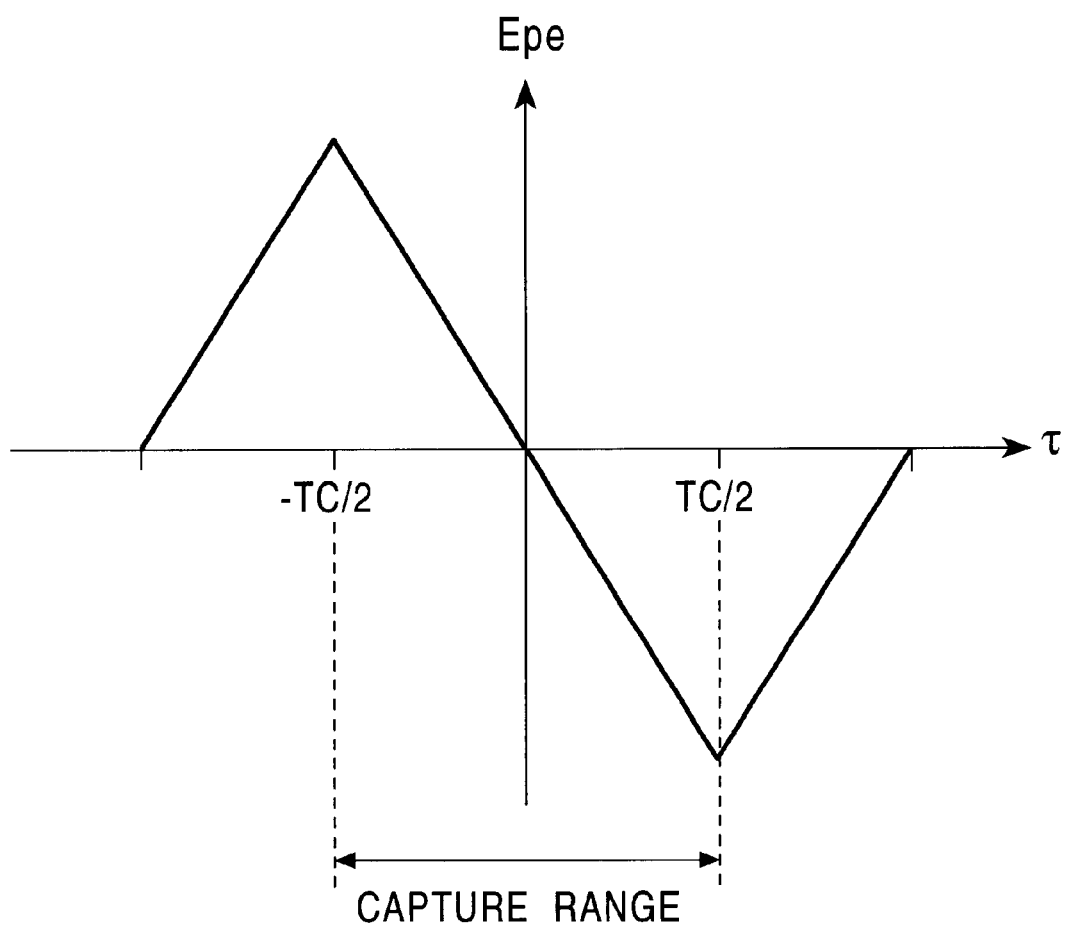
FIG. 3 is a characteristics diagram showing the characteristics of an S curve for synchronous tracking.

Here, the code sequence generator 9 is formed of a Gold code sequence generator or the like and generates pseudo-random code sequence DEC in accordance with the S curve characteristics shown in FIG. 3 based on an error signal Epe from the adder-substrator 16 and supplies the pseudorandom code sequence DEC to the delay element 10 and the selector circuit 12. Further, the code sequence generator 9 generates synchronous signals Dsbn which are synchronized with a chip duration Tc of the code sequence DEC and supplies the synchronous signal Dsbn to the timing generation circuit 13.

The delay elements 10, 11 are respectively set to a duration which is half of the chip duration Tc, that is, a delay time of a half chip duration Tc/2. Accordingly, the code sequence DPC whose phase is delayed from the code sequence DEC by the half chip duration Tc/2 are supplied from the delay element 10 to the selector circuit 12, while the code sequence DLC whose phase is delayed from the code sequence DPC by the half chip duration Tc/2 are supplied from the delay element 11 to the selector circuit 12.

The selector circuit 12 is formed of a multiplexer or the like and exclusively changes over the code sequence DEC, DPC, DLC in accordance with changeover control signals DSELE, DSELP, DSELL from the timing generator 13 and outputs them as the code sequence DSC for an inverse spreading. Here, the code sequence DEC constitute an early code, the code sequence DPC constitute a reference code and the code sequence DLC constitute a late code.

The inverse spreading circuit 17 is formed of a correlation circuit which performs the cross correlation arithmetic between the received signals Din and the code sequence DSC and supplies the correlation output (that is, the inverse spreading output) DCOR to the integrator 18.

The integrator 18 integrates the correlation output DCOR and the supplies the integrated output (that is, the detection output) Dout to the sample-hold circuits 14, 15 which constitute a holding part and also supplies the integrated output Dout to a decoding circuit or the like not shown in the drawing.

The sample-hold circuits 14, 15 sample and hold the integrated outputs Dout in accordance with respective sample-hold control signals DSHEC, DSHLC from the timing generator 13 and supply signals DSH1, DSH2 which are sampled and held (hereinafter called, "sample-hold signals") to the adder-subtractor 16.

The adder-subtractor 16 is error detector for performing the difference arithmetic of the sample-hold signals DSH1, DSH2 and supplies the arithmetic result (DSH1−DSH2) to the code sequence generator 9 as an error signal Epe.

Then, when the adder-subtractor 16 obtains the error signal Epe (=DSH1−DSH2), the code sequence generator 9 adjusts the code sequence DEC by adjusting the phase $\tau$ thereof such that the value of the error signal Epe approaches 0 within a capture range within $\pm Tc/2$ in accordance with the S curve shown in FIG. 3 and outputs them. That is, the adder-subtractor 16 performs a so-called "synchronous tracking".

The timing generator 13 generates the changeover control signals DSELE, DSELP, DSELL and the sample-hold control signals DSHEC, DSHLC in synchronous with respective symbol duration Ti based on the synchronous signals Dsbn. Then, the timing generator 13 supplies the changeover control signals DSELE, DSELP, DSELL to the selector circuit 12 and supplies the sample-hold control signals DSHEC, DSHLC to the sample-hold circuits 14, 15.

Figure 4:
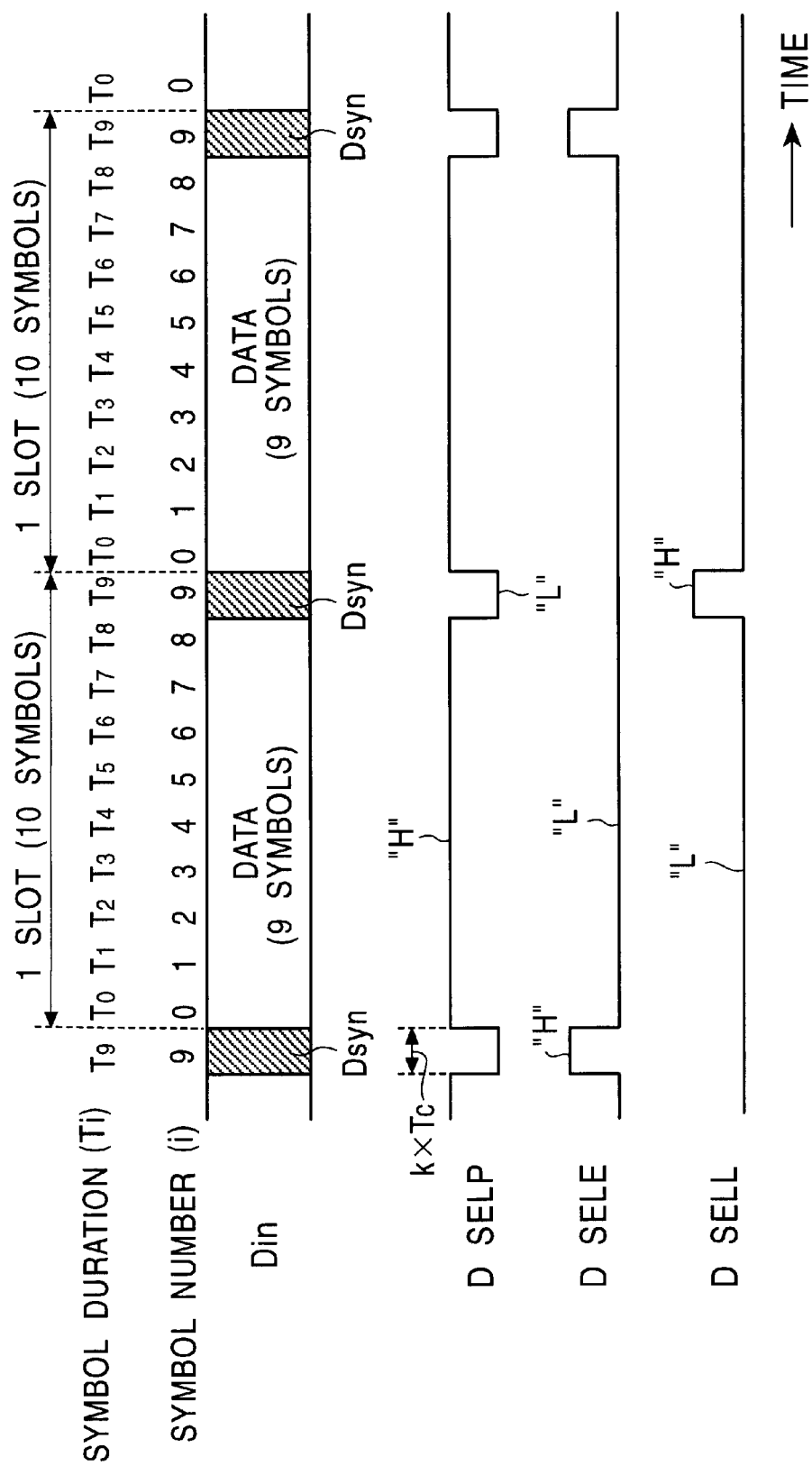
FIG. 4 is a view showing a data structure of received signals.

Here, as a typical example, the timing of the changeover control signals DSELE, DSELP, DSELL and the sample-hold control signals DSHEC, DSHLC at the time of receiving the received signal Din having the data structure shown in FIG. 4 is explained.

As shown in FIG. 4, in the received signal Din, each slot is constituted by 10 (i=0−9) symbols, wherein 9 symbols from the 0th symbol to the 8th symbol form data DATA which have information to be originally reproduced such as data of sound data, image data, computer programs (hereinafter called "original data"). Further, the 9th symbol forms the synchronous data Dsyn for a slot detection. Further, the symbol duration Ti of each symbol has the time width (k×Tc) which is integer times (k times) larger than the chip duration Tc.

In processing the received signal Din having such a data structure, the timing generator 13 outputs the changeover control signal DSELP having a logic value "H" in the symbol duration T0−T8 and alternatively outputs the changeover control signals DSELE and DSELL having a logic value "H" in the symbol duration T9. Further, the timing generator 13 alternately outputs the sample-hold control signals DSHEC and DSHLC having a logic value "H" in the symbol duration T0.

Accordingly, the selector circuit 12 outputs the reference code DPC as the code sequence DSC for an inverse spreading in accordance with changeover control signal DSELP having the logic value "H" in the symbol duration T0–T8 and alternately outputs the early code DEC and the late code ELC as the code sequence DSC for an inverse spreading in accordance with changeover control signals DSELE and DSELL which alternately become the logic value "H" in the symbol duration T9.

Further, the sample-hold circuits 14, 15 alternately sample and hold the integrated outputs Dout in accordance with the sample-hold control signals DSHEC, DSHLC which alternately become the logic value "H" in the symbol duration T0.

Due to such a constitution, in the symbol duration T0–T8, the reference code DPC used for performing the inverse spreading of the original data DATA contained in the received signals Din is supplied to the inverse spreading circuit 17, while in the symbol duration T9, the code sequence for performing the inverse spreading of the synchronous data Dsyn for slot detection contained in the received signals Din, that is, the early code DEC and the late code DLC are alternately supplied to the inverse spreading circuit 17.

Further, when the inverse spreading circuit 17 obtains the cross correlation between the received signals Din and the early codes DEC in the symbol duration T9, the integrator 18 outputs the integrated output Dout in the next symbol duration T0 and further the sample-hold circuit 14 samples and holds the integrated output Dout in accordance with the instruction of the sample-hold control signal DSHEC in the next symbol duration T0.

Further, when the inverse spreading circuit 17 obtains the cross correlation between the received signal Din and the late code DLC in the symbol duration T9 after a lapse of 1 slot duration, the integrator 18 outputs the integrated output Dout in the subsequent symbol duration T0. Further, in the symbol duration T0, the sample-hold circuit 14 samples and holds the integrated output Dout in accordance with the instruction of the sample-hold control signal DSHLC.

The case which handles the received signal Din having the data structure shown in FIG. 4 has been explained heretofore for facilitating the understanding of the explanation. However, also in a case in which the received signal having other data structure is handled, the timing generator 13 can generate the changeover control signals DSELE, DSELP, DSELL and the sample-hold control signals DSHEC, DSHLC which are in synchronous with respective symbol duration Ti and controls the selector circuit 12 and the sample-hold circuits 14, 15.

Subsequently, the manner of operation of the receiving device having such a constitution is explained in conjunction with a flow chart shown in FIG. 5 and a timing chart shown in FIG. 6. The timing chart shown in FIG. 6 shows the generating timing of respective signals generated when the DLL circuit is operated in accordance with the flow chart shown in FIG. 5.

In FIG. 5, when a user or the like sets the receiving device in a reception state by manipulating the receiving device, the timing generating circuit 13 sets flag data to FLG=0 in a given register (not shown in the drawing)(step S10) and thereafter the symbol duration Ti is judged (step S12). Here, when the symbol duration Ti is T9, the processing advances to step S14 and otherwise advances to step S40.

In step S14, the value of the flag data FLG is checked and if the flag data is FLG=0, the processing advances to step S16 and otherwise advances to step S26 if the flag data is FLG=1.

In step S16, the changeover control signal DSELE of the logic value "H" is supplied from the timing generator 13 to the selector circuit 12. Accordingly, as indicated in the symbol duration T0 in FIG. 6, the early code DEC is supplied to the inverse spreading circuit 17 as the code sequence DSC for inverse spreading.

Subsequently, in step S18 and step S20, the inverse spreading circuit 17 obtains the cross correlation between the code sequence DSC and the received signals Din and the integrator 18 integrates the correlation output D COR. That is, the cross correlation arithmetic between the early code DEC and the synchronous data Dsyn for slot detection contained in the received signals Din is performed, and further, the correlation output D COR is integrated so that the integrated output Dout which undergoes an envelope detection is outputted. Here, the integrated output Dout is outputted to the symbol duration T0 next to the symbol duration T9.

Subsequently, in step S22, the sample-hold circuit 14 samples and holds the integrated output Dout in accordance with the sample-hold control signal DSHEC of the logic value "H" and outputs the sample-hold signal DSH1 to the adder-subtractor 16. Here, the sample-hold control signal DSHEC, as shown in FIG. 6, becomes the logic value "H" at a cycle of once in 2 slot durations so that the sample-hold signal DSH1 is held over 2 slot durations.

Subsequently, in step S24, the timing generating circuit 13 sets the flag data to FLG=1 and thereafter the processing advances to step S36.

In this manner, in steps S16–S24, the processing in which the synchronous data Dsyn is inversely spread by the early code DEC and then the integrated output Dout is held in the sample-hold circuit 14 is performed.

On the other hand, when the processing advances from step S14 to step S26 (when the flag data is set to FLG=1), in step S26, the changeover control signal DSELL having the logic value "H" is supplied from the timing generator 13 to the selector circuit 12. Accordingly, as indicated in the symbol duration T0 in FIG. 6, the late code DLC is supplied to the inverse spreading circuit 17 as the code sequence DSC for inverse spreading.

Subsequently, in step S28 and step S30, the inverse spreading circuit 17 obtains the cross correlation between the code sequence DSC and the received signals Din and the integrator 18 integrates the correlation output DCOR generated by the above-mentioned cross correlation. That is, the cross correlation arithmetic between the late code DLC and the synchronous data Dsyn for slot detection contained in the received signals Din is performed, and further, the correlation output DCOR is integrated so that the integrated output Dout which undergoes the envelope detection is outputted. Here, the integrated output Dout is outputted to the symbol duration T0 next to the symbol duration T9.

Subsequently, in step S32, the sample-hold circuit 15 samples and holds the integrated output Dout in accordance with the sample-hold control signal DSHLC of the logic value "H" and outputs the sample-hold signal DSH2 to the adder-subtractor 16. Here, the sample-hold control signal DSHLC, as shown in FIG. 6, becomes the logic value "H" at a cycle of once in 2 slot durations so that the sample-hold signal DSH2 is held over 2 slot durations.

Subsequently, in step S34, the timing generating circuit 13 sets the flag data to FLG=0 and thereafter the processing advances to step S40.

In this manner, each time the value of the flag data FLG is alternately changed between "0" and "1", the processing of step S16 to S24 and the processing of step S26 to S34 are alternately repeated. Further, in step S16 to S24, the synchronous data Dsyn in the symbol duration T9 is subjected to the inverse spreading processing based on the early code DEC and in step S26 to S34, the synchronous data Dsyn in the symbol duration T9 is subjected to the inverse spreading processing based on the late code DLC. That is, the processing of step S16 to S24 and the processing of step S26 to S34 are alternately performed by a time-sharing operation.

Further, since the value of the flag data FLG is alternately changed each 1 slot duration, as shown in FIG. 6, the sample-hold signals DSH1, DSH2 are alternately updated at a timing shifted by 1 slot duration.

Subsequently, in step S36, the adder-subtractor 16 generates an error signal Epe (=DSH1−DSH2) based on the sample-hold signal DSH1, DSH2 and, further, in step S38, the spread code sequence generator 9 outputs the code sequence (early code) DEC such that the phase thereof is controlled in response to the level of an error signal Epe.

That is, the sample-hold signal DSH1 indicates the actual phase difference between the synchronous data Dsyn and the early code DEC and the sample-hold signal DSH2 indicates the actual phase difference between the synchronous data Dsyn and the late code DLC and hence, the error signal Epe which indicates the phase difference between the synchronous data Dsyn and the reference code DPC is outputted from the adder-subtractor 16.

Then, based on the level at the error signal Epe, the spread code sequence generator 9 automatically adjusts the phase of the code sequence DEC in accordance with the S curve shown in FIG. 3. Accordingly, a feedback control is performed such that the reference code DPC whose phase agrees with the phase of the synchronous data Dsyn, the early code DEC which leads the reference code DPC in phase by the half chip duration Tc/2 and the late code DLC which is delayed from the reference code DPC in phase by the half chip duration Tc/2 can be generated. Further, a feedback control is performed such that the synchronous signal Dsbn whose phase agrees with the phase of the reference code DPC is supplied to the timing generator 13 from the spread code sequence generator 9.

Subsequently, in step S40, it is checked whether the timing generator 13 is in the symbol duration Ti or not and if the symbol duration Ti is any one of the symbol duration T0–T8, the processing advances to step S42. In step S42, the changeover control signal DSELP having the logic value "H" which is in synchronous with the synchronization signal Dsbn is supplied to the selector circuit 12 so that the reference code DPC is supplied to the inverse spreading circuit 17 as the inverse spreading series DSC.

In step S44, the inverse spreading circuit 17 performs the cross correlation arithmetic between the reference code DPC and the received signal Din, and then, in step S46, the integrator 18 integrates the correlation outputs DCOR and generates and outputs the integrated output Dout.

In this manner, in steps S42 to S46, the received signals Din are inversely spread based on the reference code DPC whose phase is adjusted in step S38 and hence, the original data DATA of the symbol duration T0–T8 can be inversely spread at high accuracy and further the detection output (integrated output) is generated by integrating the inverse spreading output (correlation output) DCOR.

Then, when the processing in step S46 is completed or if it is judged that the symbol duration T0 does not correspond to any one of the symbol duration T1 to T8 in step S40, the processing starting from step S12 is repeated. That is, the processing of steps S12 to S46 is repeated at a cycle of respective symbol duration Ti and simultaneously is repeated until the user or the like interrupts the communication state.

Further, the processing of steps S16–S24, the processing of steps S26–S34 and the processing of steps S12–S46 described above are repeatedly performed by a time-sharing operation.

In this manner, the first embodiment is constituted such that with the use of one inverse spreading circuit 17 and one integrator 18, the cross correlation arithmetic (inverse spreading) between the reference code DPC, the early code DEL or the late code DLC and the received signals Din and the integration (detection) are performed and hence, the receiving device having a small-sized circuit can be realized. Particularly, when the embodiment is applied to the RAKE system receiving device which uses a multipath positively, a large advantageous effect can be obtained.

Further, since the circuit scale can be made small, the power consumption can be reduced. Particularly, this embodiment exhibits the large advantageous effect when the receiving device is used as a receiving device driven by a battery such as a cordless telephone, a portable telephone, a mobile communication or the like.

Although the cross correlation arithmetic is not performed between the early code DEC and the late code DLC and the received signals Din in the symbol duration T0–T8, by performing the cross correlation arithmetic between the early code DEC and the late code DLC and the synchronous data Dsyn every 1 slot duration, the synchronism with the received signal Din can be ensured.

Subsequently, the receiving device of the second embodiment is explained in conjunction with FIG. 7 to FIG. 9.

Figure 1:
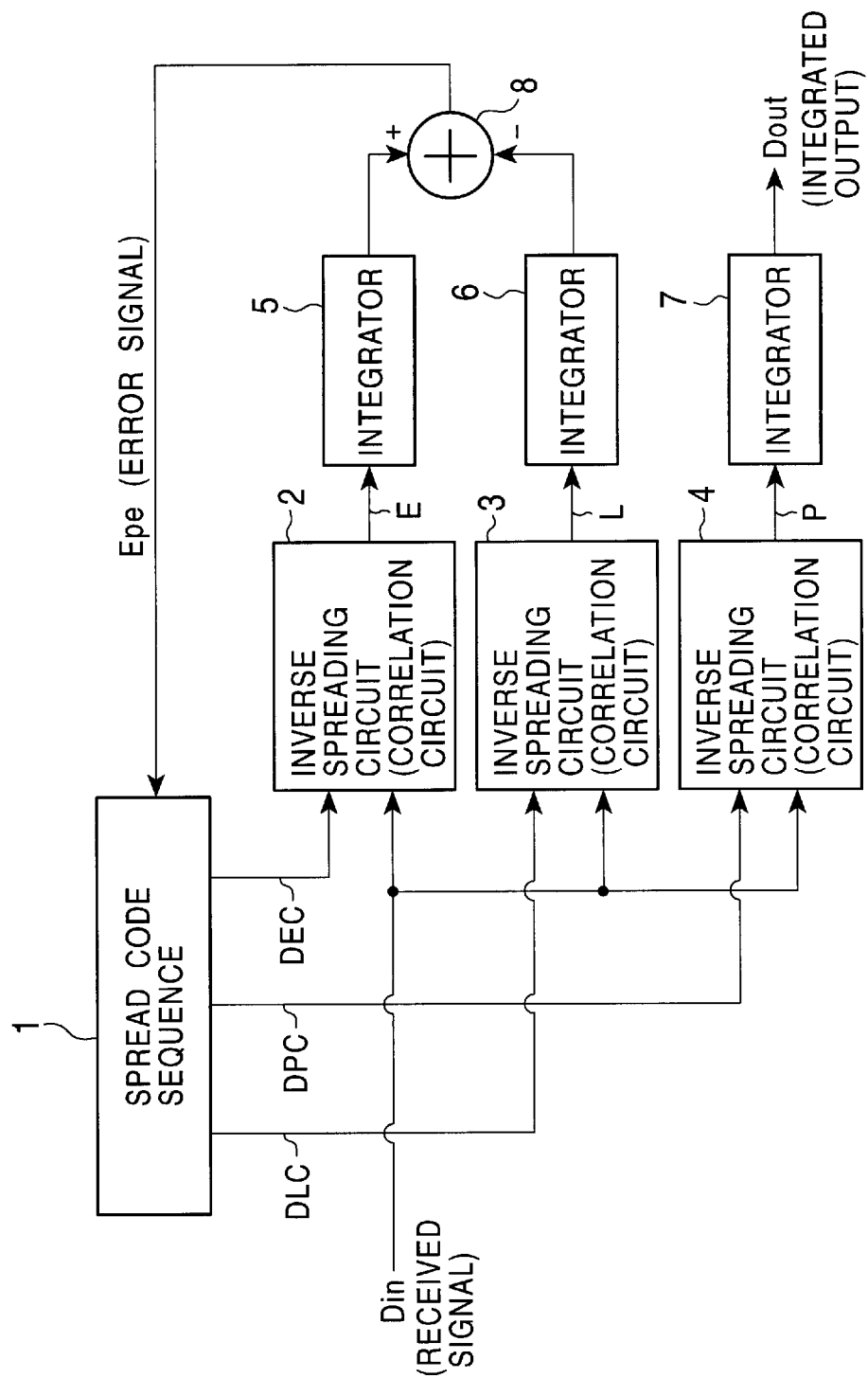
FIG. 1 is a block diagram showing a constitution of a conventional DLL circuit.

The receiving device of the second embodiment is constituted such that a DLL circuit shown in a block diagram of FIG. 7 is provided to the receiving device. In FIG. 7, parts which are identical with or correspond to the parts shown in FIG. 1 are given the same symbols.

That is, to explain the difference between the DLL circuit of this embodiment and the DLL circuit shown in FIG. 2, the DLL circuit shown in FIG. 7 is provided with two inverse spreading circuits 17A, 17B and two integrators 18A, 18B, wherein a reference code DRC is supplied to the inverse spreading circuit 17B and an early code DEC and a late code DLC are supplied to the inverse spreading circuit 17A through a selector circuit 12A.

Then, when the timing generator 13 makes the selector circuit 12A perform the changeover control using the changeover control signals DSELE, DSELL, the code sequence DSC supplied to the inverse spreading circuit 17A can be changed over to the early code DEC or the late code DLC.

Further, an integrator 18A integrates a correlation output DCOR1 outputted from the inverse spreading circuit 17A and sample-hold circuits 14, 15 alternately sample and hold the integrated output DINT in accordance with the sample-hold control signals DSHEC, DSHLC.

Further, the integrator 18B integrates a correlation output DCOR2 outputted from the inverse spreading circuit 17B and outputs the integrated output Dout as a detection output of the received signal Din.

That is, the DLL circuit of this embodiment performs the cross correlation arithmetic (inverse spreading) between the reference code DPC and the received signal Din by the inverse spreading circuit 17B and the integrator 18B and simultaneously detects the inverse spreading output (correlation output) DCOR2 generated by the cross correlation arithmetic. Then, to ensure the synchronism with the received signal Din, the inverse spreading circuit 17A and the integrator 18A are provided.

Subsequently, the manner of operation of the DLL circuit having such a constitution is explained in conjunction with a flow chart shown in FIG. 8 and a timing chart shown in FIG. 9. For facilitating the understanding of the explanation, a case in which the received signal Din having the data structure shown in FIG. 2 is processed is explained.

As shown in FIG. 8, when a user or the like manipulates the receiving device such that the receiving device is set to a reception state, the timing generator 13 checks a symbol number (number of each symbol duration) in step S30. Here, when the symbol number is an even number (that is, any one of 0, 2, 4, 6, 8), the processing advances to step S32, while when the symbol number is an odd number (that is, any one of 1, 3, 5, 7, 9), the processing advances to step S40.

In step S32, the changeover control signal DSELE is supplied from the timing generator 13 to the selector circuit 12A and the code sequence DSC supplied to the inverse spreading circuit 17A becomes the early code DEC. That is, in the symbol duration T0, T2, T4, T6, T8 shown in FIG. 9 which have the even number, the early code DEC is supplied to the inverse spreading circuit 17A.

Subsequently, in step S34, the inverse spreading circuit 17A performs the cross correlation arithmetic (inverse spreading) between the received signals Din and the early code DEC and further, in step S36, the integrator 18A integrates the correlation output DCOR1 and outputs the integrated output DINT.

Then, in step S38, the sample-hold circuit 14 samples and holds the integrated outputs DINT in accordance with the sample-hold control signal DSHEC.

That is, the timing generator 13 generates and outputs the sample-hold control signal DSHEC which becomes the logic value "H" in the even-number symbol duration T0, T2, T4, T6, T8 based on the synchronous signal Dsbn which is in synchronous with the chip duration Tc of the code sequence DEC as shown in FIG. 9. Then, the sample-hold circuit 14 samples and holds the integrated output DINT in accordance with the sample-hold control signal DSHEC of this logic value "H".

In this manner, in step S32–S38, the received signals Din in the even-number symbol duration are inversely spread by the early code DEC and then the integrated output DINT is sampled and held in the sample-hold circuit 14.

As shown in FIG. 9, since the sample-hold control signal DSHEC becomes the logic value "H" at a cycle of once in two symbol duration, the sample-hold signal DSH1 is updated every 2 symbol durations.

On the other hand, when the processing advances to the step S40 (symbol number i being an odd number), in the step S40, the changeover control signal DSELL is supplied to the selector circuit 12A from the timing generator 13 and the code sequence DSC supplied to the inverse spreading circuit 17A become the late code DLC. That is, in the odd-number symbol duration T1, T3, T5, T7, T9 shown in FIG. 9, the late code DLC is supplied to the inverse spreading circuit 17A.

Subsequently, in step S42, the inverse spreading circuit 17A performs the cross correlation arithmetic (inverse spreading) between the received signals Din and the late code DLC and further, in step S44, the integrator 18A integrates the correlation output DCOR1 and outputs the integrated output DINT.

Then, in step S46, the sample-hold circuit 15 samples and holds the integrated outputs DINT in accordance with the sample-hold control signal DSHLC.

That is, the timing generator 13 generates and outputs the sample-hold control signal DSHLC which becomes the logic value "H" in the odd-number symbol duration T1, T3, T5, T7, T9 based on the synchronous signal Dsbn which is in synchronous with the chip duration Tc of the code sequence DEC as shown in FIG. 9. Then, the sample-hold circuit 15 samples and holds the integrated output DINT in accordance with the sample-hold control signal DSHLC of this logic value "H".

As shown in FIG. 9, since the sample-hold control signal DSHLC becomes the logic value "H" at a cycle of once in two symbol durations, the sample-hold signal DSH2 is updated every 2 symbol duration. Further, the updating timings of the sample-hold signal DSH1 and the sample-hold signal DSH2 are shifted by 1 symbol duration from each other.

Subsequently, in step S48, the adder-subtractor 16 generates an error signal Epe (=DSH1−DSH2) based on the sample-hold signal DSH1, DSH2 and, further, in step S50, the spread code sequence generator 9 outputs the code sequence (early code) DEC such that the phase thereof is controlled in response to the level of an error signal Epe.

That is, the sample-hold signal DSH1 indicates an actual phase shift quantity between the synchronous data Dsyn and the early code DEC and the sample-hold signal DSH2 indicates an actual phase shift quantity between the synchronous data Dsyn and the late code DLC and hence, the error signal Epe which indicates a phase shift quantity between the synchronous data Dsyn and the reference code DPC is outputted from the adder-subtractor 16.

Then, based on the level at the error signal Epe, the spread code sequence generator 9 automatically adjusts the phase of the code sequence DEC in accordance with the S curve shown in FIG. 3 thus generating the reference code DPC whose phase agrees with the phase of the synchronous data Dsyn, the early code DEC which leads the reference code DPC in phase by the half chip duration Tc/2 and the late code DLC which is delayed from the reference code DPC in phase by the half chip duration Tc/2. Further, the synchronous signal Dsbn whose phase agrees with the phase of the reference code DPC is supplied to the timing generator 13 from the spread code sequence generator 9.

Subsequently, in step S54, the inverse spreading circuit 17B performs the cross correlation arithmetic between the reference code DPC and the received signal Din so as to inversely spread the received signal Din, and then, in step S56, the integrator 18B integrates the inverse spreading output (the correlation outputs) DCOR2 outputted from the inverse spreading circuit and outputs the integrated output Dout as a detection output.

Then, when the processing in step S56 is completed, the processing starting from step S30 is repeated again and this processing is repeated until the user interrupts the calling state.

Since the processing of step S30 to S56 is performed every symbol duration Ti as shown in FIG. 9, the sample-hold signal DSH1, DSH2 are updated every 2 symbol durations and the updating timing of the sample-hold signals DSH1, DSH2 is shifted by 1 symbol duration from each other.

Then, the error signal Epe is updated every 1 symbol duration and each time the error signal Epe is updated, the phase of the code sequence DEC outputted from the spread code sequence generator 9 is made to match the phase of the received signal Din. Accordingly, the inverse spreading circuit 17B inversely spreads the received signals Din based on the phase-matched reference code DPC every symbol duration Ti and the integrator 18B integrates the inverse spreading output (correlation output) DCOR2 generated by such an inverse spreading so as to output the detection output (integrated output) Dout.

In this manner, according to the second embodiment, the receiving device is provided with two inverse spreading circuits 17A, 17B and two integrators 18A, 18B, wherein with the use of one set of inverse spreading circuit 17A and the integrator 18A, the processing for ensuring the synchronism with the received signals Din is alternately performed based on the early code DEC and the late code DLC by a time-sharing operation, while with the use of the other set of inverse spreading circuit 17B and the integrator 18B, the received signals Din are inversely spread based on the reference code DPC in the synchronism-ensured state so as to generate the detection output Dout. Accordingly, compared with the conventional DLL circuit, the receiving device having a small-sized DLL circuit can be realized. Further, since the circuit scale can be made small, the power consumption can be reduced.

Further, in the DLL circuit of the second embodiment, the inverse spreading circuit 17A and the integrator 18A are provided exclusively for ensuring the synchronism with the received signals Din and they feedback the phase control of the code sequence generator 9 based on the difference (error signal) Epe between the sample-hold signals DSH1, DSH2 which are obtained every symbol duration. Accordingly, the synchronism with the received signals Din can be ensured at a high accuracy.

Subsequently, the receiving device of the third embodiment is explained in conjunction with FIG. 10 to FIG. 12.

The receiving device of this embodiment is constituted such that it is provided with a DLL circuit shown in a block diagram of FIG. 10. In FIG. 10, parts identical with or corresponding to the parts shown in FIG. 2 are indicated by same symbols.

To explain the difference between the DLL circuit of this embodiment and the DLL circuit shown in FIG. 2, the DLL circuit shown in FIG. 10 is provided with a sample-hold circuit 100 which samples and holds an integrated output Dout of an integrator 18 and an adder-subtractor 200 which performs an addition/subtraction of an early code DEC outputted from a code sequence generator 9 and a late code DLC outputted from a delay element 11 and supplies an addition/subtraction code DELC (=DLC−DEC) obtained by such an addition/subtraction to a selector circuit 12.

Here, the sample-hold circuit 100 samples and holds the integrated output Dout in synchronous with a sample-hold control signal DSHC from the timing generator 13 and supplies the sample-hold signal which is sampled and held by the sample-hold circuit 100 to a code sequence generator 9 as an error signal Epe.

The code sequence generator 9 generates and outputs the code sequence (early code) DEC whose phase is adjusted corresponding to the change of the level of the error signal Epe and supplies a synchronous signal Dsbn which is synchronized with the early code DEC to the timing generator 13. That is, the code sequence generator 9 adjusts the code sequence based on the synchronous signal Dsbn DEC by adjusting the phase τ thereof in accordance with the S curve shown in FIG. 3 so as to perform the synchronous tracking such that the phase of the code sequence (reference code) DPC matches with the phase of the received signal Din.

Then, the timing generator 13 outputs a sample-hold control signal DSHC which becomes a logic value "L" in respective symbol duration T9 and becomes a logic value "H" in respective symbol duration T0–T8 of received signals Sin shown in FIG. 4 based on the synchronous signal Dsbn. The sample-hold circuit 100 performs sampling of the integrated output Dout in synchronous with a rising edge during which the sample-hold control signal DSHC becomes the logic value "H" from the logic value "L" and then continuously supplies the sampled value as an error signal Epe to the code sequence generator 9 in a period until a next sample-hold control signal DSHC becomes the logic value "H" from the logic value "L".

Further, the timing generator 13 generates the changeover control signal DSLT which becomes a logic value "H" in the symbol durations T0–T8 and becomes a logic value "L" in the symbol duration T9 of received signals Sin shown in FIG. 5 based on the sychronous signal Dsbn and supplies such a changeover control signal DSLT to the selector circuit 12. Accordingly, the selector circuit 12 supplies the reference code DPC from a delay element 10 to the inverse spreading circuit 17 as code sequence DSC for an inverse spreading during a period in which the changeover control signal DSLT becomes the logic value "H" and supplies an addition/subtraction code DELC from the adder-subtractor 200 to the inverse spreading circuit 17 as code sequence DSC for inverse spreading during a period in which the changeover control signal DSLT becomes the logic value "L".

In the DLL circuit of this embodiment having such a constitution, as indicated by a timing chart shown in FIG. 11, when the received signal Din is present in the symbol duration T9, the addition/subtraction code DELC (=DLC−DEC) is supplied from the adder-subtractor 200 to the inverse spreading circuit 17 through the selector circuit 12. That is, during the period in which the changeover control signal DSLT becomes the logic value "L", the addition/subtraction code DELC is supplied to the inverse spreading circuit 17 as the code sequence DSC for an inverse spreading. Accordingly, the inverse spreading circuit 17 performs the cross correlation arithmetic between the synchronous data Dsyn in the received signal Din and the addition/subtraction code DELC and the integrator 18 integrates the correlation output DCOR which is a result of the correlation arithmetic and supplies the integrated output Dout to the sample-hold circuit 100.

Accordingly, the sample-hold circuit 100 supplies the error signal Epe which corresponds to the cross correlation value between the synchronous data Dsyn and the addition/subtraction code DELC to the code sequence generator 9.

Here, the above-mentioned correlation output DCOR is expressed by a following equation (1) and the error signal Epe is expressed by a following equation (2) similar to the following equation (1). In the following equations (1), (2), a symbol "*" indicates a correlation operator.

$$DCOR = DELC*Dsyn = (DLC-DEC)*Dsyn = DLC*Dsyn - DEC*Dsyn \quad (1)$$

$$Epe \propto DCOR = DLC*Dsyn - DEC*Dsyn \quad (2)$$

In this manner, the error signal Epe is proportional to a value which is obtained by subtracting the cross correlation value (DEC*Dsyn) between the early code DEC and the synchronous data Dsyn from the cross correlation value (DLC*Dsyn) between the late code DLC and the synchronous data Dsyn. Accordingly, the DLL circuit of this third embodiment has a function equivalent to a function with which the error signal Epe is obtained by the sample-hold circuits 14, 15 and the adder-subtractor 16 in the DLL circuit shown in FIG. 2 (the DLL circuit of the first embodiment).

That is, in the DLL circuit of the first embodiment, as shown in FIG. 2, the error signal Epe is generated by the adder-subtractor 16 provided at the input side of the code sequence generator 9. Compared with such first embodiment, in the DLL circuit of the third embodiment, as shown in FIG. 9, the error signal Epe is supplied to the code sequence generator 9 by sampling and holding a result of the correlation arithmetic between the difference DELC between the early code DEC and the late code DLC outputted from the code sequence generator 9 and the delay element 11 and the synchronous data Dsyn in the received signal Din.

As a result, the DLL circuit of the third embodiment can also perform the synchronous tracking similar to that of the DLL circuit of the first embodiment shown in FIG. 2.

Further, one sample-hold circuit 100 is sufficient in the third embodiment and hence, an advantageous effect that the scale of the receiving device can be made small compared with the receiving device of first embodiment can be obtained. Still further, compared with the selector circuit 12 shown in FIG. 2, the selector circuit 12 shown in FIG. 10 can make the circuit scale thereof small and the control of the selector circuit 12 shown in FIG. 10 can be simplified and hence, the timing generation circuit 13 of this embodiment shown in FIG. 10 can make the circuit scale thereof small.

Subsequently, the receiving device according to the fourth embodiment is explained in conjunction with FIG. 12 and FIG. 13.

The receiving device of this embodiment is constituted such that it is provided with a DLL circuit shown in FIG. 12. In FIG. 12, parts identical with or corresponding to the parts shown in FIG. 7 are indicated by same symbols.

To explain the difference between the DLL circuit of this embodiment shown in FIG. 12 and the DLL circuit shown in FIG. 7, the DLL circuit shown in FIG. 12 is provided with an adder-subtractor 200 which performs an addition/subtraction of an early code DEC outputted from a code sequence generator 9 and a late code DLC outputted from a delay element 11 and supplies an addition/subtraction code DELC (=DLC−DEC) obtained by such an addition/subtraction to an inverse spreading circuit 17A.

Further, while the DLL circuit shown in FIG. 7 is provided with the sample-hold circuits 14, 15, the DLL circuit shown in FIG. 12 is constituted such that it supplies an integrated output of the integrator 18A as an error signal Epe to a code sequence generator 9 without having such sample-hold circuits.

Still further, while the DLL circuit of the first to third embodiments is provided with the selector circuit 12 and the timing generator 13, the DLL circuit of this fourth embodiment is not provided with any one of the selector circuit and the timing generator so that the addition/subtraction code DELC is directly supplied from the adder-substractor 200 to an inverse spreading circuit 17A and simultaneously a reference code DPC is directly supplied from a delay element 10 to an inverse spreading circuit 17B.

According to the DLL circuit of this embodiment having such a constitution, as indicated by a timing chart shown in FIG. 13, the inverse spreading circuit 17A obtains the cross correlation between the addition/subtraction code DELC and the received signal Din at a cycle of each symbol duration T1 of the received signal Din and then an integrator 18A integrates the correlation output DCOR1 obtained by such a cross correlation. Accordingly, the integrated outputs generated every symbol duration Ti by the integrator 18A are supplied to the code sequence generator 9 as the error signal Epe. Then, the code sequence generator 9 automatically adjusts the phase of the code sequence DEC in accordance with the S curve shown in FIG. 3 so as to perform the feedback control for making the received signal Din track the reference code DPC synchronously.

On the other hand, the inverse spreading circuit 17B performs the cross correlation arithmetic between the reference code DPC which is synchronously tracked and the received signal Din and hence, the data DATA in the received signal Din is inversely spread and the integrator 18B integrates the inverse spreading output DCOR2 generated by such an inverse spreading so as to generate and output the detection output (integrated output) Dout.

Here, the error signal Epe generated by the above-mentioned integrator 18A becomes a value proportional to the inverse spreading output DCOR1 generated by the inverse spreading circuit 17A as expressed by a following equation (3). Symbol "*" in the following equation (3) indicates a correlation operator.

$$Epe \propto DCOR1 = DELC*Din = (DLC-DEC)*Din = DLC*Dsyn - DEC*Dsyn \quad (3)$$

In this manner, the error signal Epe is proportional to a value which is obtained by subtracting the cross correlation value (DEC*Din) between the early code DEC and the received signal Din from the cross correlation value (DLC DLC*Din) between the late code DLC and the received signal Din. Accordingly, the DLL circuit of this fourth embodiment has a function equivalent to a function with which the error signal Epe is obtained by the sample-hold circuits 14, 15 and the adder-subtractor 16 in the DLL circuit shown in FIG. 7 (the DLL circuit of the second embodiment). As a result, even with the DLL circuit of the fourth embodiment, the similar simultaneous tracking can be realized as in the case of the DLL circuit of the second embodiment shown in FIG. 7.

Further, compared with the DLL circuit of the second embodiment, the DLL circuit of the fourth embodiment has a small number of parts and hence has a simple structure so that an advantageous effect that the receiving device having a small scale can be provided is obtained.

In the above-mentioned first to fourth embodiments, the processing to ensure the synchronism with the received signal Din is performed by inversely spreading the synchronous data Dsyn contained in the received signal Din based on the early code DEC and the late code DLC. However, the present invention is not limited to such processing. That is, without being limited to the use of the synchronous data Dsyn, the processing to ensure the synchronism with the received signal Din may be performed by inversely spreading data other than the original data DATA such as various kinds of control data inserted and transmitted to the transmission side for surely transmitting the original data DATA based on the early code DEC and the late code DLC.

As has been explained heretofore, according to the present invention, the processing to ensure the synchronism with the received signal and the processing to perform the inverse spreading of the received signal to obtain the inverse spreading output can be performed with the least number of correlation arithmetic parts and the integrators whereby the receiving device having the least number of parts and has a circuit of a recuded scale can be provided.

What is claimed is:

1. A receiving device for a spread spectrum communication system comprising:
   a correlation arithmetic part which performs a cross correlation arithmetic between a code sequence and a received signal;
   an integrator which integrates a correlation output generated by said correlation arithmetic part;
   a holding part which holds an integrated output generated by said integrator;
   an error detector which generates an error signal indicative of a phase difference between said code sequence and said received signal based on a holding signal held by said holding part; and
   a code sequence generator which performs a phase control operation so that said code sequence match in phase with said received signal based on said error signal generated by said error detector and supplies a phase-controlled code sequence to said correlation arithmetic part, wherein
      said correlation arithmetic part performs a cross correlation arithmetic between data other than original data which is included in said received signal and said code sequence and a cross correlation arithmetic between said original data included in said received data and said code sequence in a time-sharing fashion, and
      said holding part holds integrated outputs outputted from said integrator when said correlation arithmetic part performs said cross correlation arithmetic between said data other than said original data which is included in said received signal and said code sequence.

2. A receiving device for a spread spectrum communication system according to claim 1, wherein said code sequence generator generates a reference code, an early code and a late code having given phase differences among them as said code sequence,
   said correlation arithmetic part alternately performs the cross correlation arithmetic between data other than original data included in said received data and said early code and the cross correlation arithmetic between data other than original data included in the received data and the late code, and further performs the cross correlation arithmetic between the original data included in said received signal and said reference code in a time-sharing fashion,
   said holding part holds each of integrated outputs alternately outputted from the integrator by the correlation arithmetic alternately performed based on said early code and said late code as said holding signals, and
   said error detector produces a difference between a holding signal corresponding to said early code and a holding signal corresponding to said late code as said error signal.

3. A receiving device for a spread spectrum communication system comprising:
   a correlation arithmetic part which performs a cross correlation arithmetic between a code sequence and a received signal;
   an integrator which integrates a correlation output generated by said correlation arithmetic part;
   a holding part which holds an integrated output generated by said integrator;
   a code sequence generator for performing a phase control operation and outputs said code sequence in a way that said code sequence are made to match in phase with said received signals based on a holding signal held by said holding part and also outputs a delay code sequence which is delayed from said code sequence by a given phase and a leading code sequence which leads said code sequence by the given phase; and
   an adder-subtractor which generates a differential code sequence of difference between said delay code sequence and said leading code sequence which are outputted from said code sequence generator, wherein
      said correlation arithmetic part performs a cross correlation arithmetic between data other than an original data which is included in said received signal and said differential code sequence and a cross correlation arithmetic of the original data included in said received signals and said code sequence in a time-sharing fashion, and
      said holding part holds an integrated output outputted from said integrator when said correlation arithmetic part performs the cross correlation arithmetic between said data other than said original data which is included in said received signal and said differential code sequence.

4. A receiving device for a spread spectrum communication system comprising:
   a code sequence generator which generates and outputs a code sequence, a phase-delay code sequence which is delayed from the code sequence by a given phase and a phase-leading code sequence which leads said code sequence by the given phase;
   an adder-subtractor which generates a differential code sequence of a difference between said phase-delay code sequence and said phase-leading code sequence outputted from said code sequence generator;
   a first correlation arithmetic part which performs a cross correlation arithmetic between said differential code sequence and a received signal;
   an integrator which integrates a correlation output generated by said first correlation arithmetic part, and
   a second correlation arithmetic part for performing the cross correlation arithmetic between said code sequence and said received signal, wherein
      said code sequence generating part performs a phase control operation based on an integrated output signal outputted from the integrator so that said code sequence, said phase-delay code sequence and said phase-leading code sequence match in phase with said received signal, and outputs phase controlled code sequences.

5. A receiving device for a spread spectrum communication system comprising:
   correlation arithmetic means for performing a cross correlation arithmetic between a code sequence and a received signal;
   integrating means for integrating a correlation output generated by said correlation arithmetic means;
   holding means for holding an integrated output generated by said integrating means;
   error detecting means for generating an error signal indicative of a phase difference between said code sequence and said received signal based on a holding signal held by said holding means; and
   code sequence generating means for performing a phase control operation so that said code sequence match in phase with said received signal based on said error signal generated by said error detection means and supplies a phase-controlled code sequence to said correlation arithmetic means, wherein said correlation arithmetic means performs a cross correlation arithmetic between data other than original data which is included in said received signal and said code sequence and a cross correlation arithmetic between said original data included in said received data and said code sequence in a time-sharing fashion, and said holding means holds integrated outputs outputted from said integrating means when said correlation arithmetic means performs said cross correlation arithmetic between said data other than said original data which is included in said received signal and said code sequence.

6. A receiving device for a spread spectrum communication system according to claim 5, wherein said code sequence generating means generates a reference code, an early code and a late code having given phase differences among them as said code sequence, said correlation arithmetic means alternately performs the cross correlation arithmetic between data other than original data included in said received data and said early code and the cross correlation arithmetic between data other than original data included in the received data and the late code, and further performs the cross correlation arithmetic between the original data included in said received signal and said reference code in a time-sharing fashion, said holding means holds each of integrated outputs alternately outputted from the integrator by the correlation arithmetic alternately performed based on said early code and said late code as said holding signals, and said error detection means produces a difference between a holding signal corresponding to said early code and a holding signal corresponding to said late code as said error signal.

7. A receiving device for a spread spectrum communication system comprising:

correlation arithmetic means for performing a cross correlation arithmetic between a code sequence and a received signal;

integrating means for integrating a correlation output generated by said correlation arithmetic means;

holding means for holding an integrated output generated by said integrating means;

code sequence generating means for performing a phase control operation and outputs said code sequence in a way that said code sequence are made to match in phase with said received signals based on a holding signal held by said holding means and also outputs a delay code sequence which is delayed from said code sequence by a given phase and a leading code sequence which leads said code sequence by the given phase; and adder-subtractor means for generating a differential code sequence of difference between said delay code sequence and said leading code sequence which are outputted from said code sequence generating means, wherein said correlation arithmetic means performs a cross correlation arithmetic between data other than an original data which is included in said received signal and said differential code sequence and a cross correlation arithmetic of the original data included in said received signals and said code sequence in a time-sharing fashion, and said holding means holds an integrated output outputted from said integrating means when said correlation arithmetic means performs the cross correlation arithmetic between said data other than said original data which is included in said received signal and said differential code sequence.

8. A receiving device for a spread spectrum communication system comprising:

code sequence generating means for generating and outputting a code sequence, a phase-delay code sequence which is delayed from the code sequence by a given phase and a phase-leading code sequence which leads said code sequence by the given phase;

adder-subtractor for generating a differential code sequence of a difference between said phase-delay code sequence and said phase-leading code sequence outputted from said code sequence generating means;

first correlation arithmetic means for performing a cross correlation arithmetic between said differential code sequence and a received signal;

integrating means for integrating a correlation output generated by said first correlation arithmetic means, and second correlation arithmetic means for performing the cross correlation arithmetic between said code sequence and said received signal, wherein said code sequence generating means performs a phase control operation based on an integrated output signal outputted from the integrating means so that said code sequence, said phase-delay code sequence and said phase-leading code sequence match in phase with said received signal, and outputs phase controlled code sequences.

* * * * *